US008459159B2

(12) United States Patent
Jessen et al.

(10) Patent No.: US 8,459,159 B2
(45) Date of Patent: Jun. 11, 2013

(54) COMPRESSED HEAT INSULATION HOUSING

(75) Inventors: Erling Jessen, Haderslev (DK); Fleming Lund Jensen, Vamdrup (DK)

(73) Assignee: Saint-Gobain Isover, Courbevoie (FR)

( * ) Notice: Subject to any disclaimer, the term of this patent is extended or adjusted under 35 U.S.C. 154(b) by 548 days.

(21) Appl. No.: 12/548,253

(22) Filed: Aug. 26, 2009

(65) Prior Publication Data
US 2010/0132521 A1 Jun. 3, 2010

Related U.S. Application Data

(63) Continuation of application No. 10/483,406, filed as application No. PCT/FR02/02416 on Jul. 10, 2002, now abandoned.

(30) Foreign Application Priority Data

Jul. 17, 2001 (WO) .................. PCT/DK01/00498
Oct. 31, 2001 (FR) ...................... 01 14106

(51) Int. Cl.
*B26F 1/14* (2006.01)
(52) U.S. Cl.
USPC ............. 83/123; 83/621; 83/164; 83/685
(58) Field of Classification Search
USPC ............. 83/123, 125, 23, 44, 50, 684, 164, 83/621, 51, 451, 685
See application file for complete search history.

(56) References Cited

U.S. PATENT DOCUMENTS

| 1,941,016 | A | * | 12/1933 | Mayle | 83/140 |
| 2,141,492 | A | * | 12/1938 | Southwick | 83/162 |
| 2,365,902 | A | * | 12/1944 | Powers | 225/2 |
| 2,371,734 | A | * | 3/1945 | Buttress | 83/51 |
| 2,526,741 | A | * | 10/1950 | Goemaere | 83/164 |

(Continued)

FOREIGN PATENT DOCUMENTS

| DE | 2 014 555 | 11/1970 |
| DE | 44 17 110 | 11/1995 |

(Continued)

OTHER PUBLICATIONS

Barker, Gary et al., Engineering and Ginning: Relative Velocity, Density, and Temperature Eeffects on Cotton Moisture Transfer Rates. The Journal of Cotton Science, 2001, pp. 5:243-251 [online], [retrieved on Oct. 22, 2012]. Retrieved from the Internet <URL:http://www.cotton.org/journal/2001-05/4/upload/jcs05-243.pdf>.*

*Primary Examiner* — Kenneth E. Peterson
*Assistant Examiner* — Jennifer Swinney
(74) *Attorney, Agent, or Firm* — Oblon, Spivak, McClelland, Maier & Neustadt, L.L.P.

(57) ABSTRACT

The invention relates to an assembly comprising, on the one hand, a tubular compressed mineral wool felt element and, on the other hand, at least one means of maintaining the compression state of the said felt. The maintaining means may be a film surrounding the felt element on its cylinder-shaped surface. The assembly may be used as an insulating pipe section for pipework. The invention also relates to a method of producing annular elements, by way of punching, where the starting material is a web of bonded fibrous material, such as tempered mineral wool. A punching tool in the form of at least one punch knife which is mounted on a press plate is pressed through the web then pulled out again.

8 Claims, 6 Drawing Sheets

U.S. PATENT DOCUMENTS

| | | | |
|---|---|---|---|
| 3,263,771 A * | 8/1966 | Seifert | 181/252 |
| 3,329,051 A | 7/1967 | Derwin | |
| 3,495,492 A * | 2/1970 | Gerber et al. | 83/374 |
| 3,648,555 A | 3/1972 | Schraud et al. | |
| 3,797,341 A * | 3/1974 | Bystron | 83/14 |
| 3,961,858 A * | 6/1976 | Smith et al. | 408/204 |
| 3,974,013 A | 8/1976 | Roos | |
| 4,176,105 A | 11/1979 | Miedaner | |
| 4,205,105 A | 5/1980 | Blundell | |
| 4,205,835 A * | 6/1980 | Gerber | 269/289 R |
| 4,509,396 A * | 4/1985 | Schall et al. | 83/126 |
| 4,606,957 A | 8/1986 | Cohen | |
| 4,656,906 A * | 4/1987 | Mozieka et al. | 83/451 |
| 4,847,140 A * | 7/1989 | Jaskowski | 428/220 |
| 5,665,447 A * | 9/1997 | Greaves et al. | 428/68 |
| 6,408,729 B1 * | 6/2002 | Johnson | 83/697 |
| 7,121,178 B2 * | 10/2006 | Halamoda et al. | 83/164 |

FOREIGN PATENT DOCUMENTS

| | | |
|---|---|---|
| EP | 315127 | 5/1989 |
| FR | 1 090 209 | 3/1955 |
| GB | 878517 | 10/1961 |
| JP | 51-35044 | 9/1976 |
| JP | 54122485 A * | 9/1979 |
| JP | 58000331 A * | 1/1983 |
| JP | 61189832 A * | 8/1986 |
| JP | 01245927 A * | 10/1989 |
| JP | 8-290500 | 11/1996 |
| SE | 373 928 | 2/1975 |
| SU | 607563 | 5/1978 |
| SU | 897786 | 6/2006 |
| WO | 96 08438 | 3/1996 |
| WO | 96 37728 | 11/1996 |
| WO | 98 12466 | 3/1998 |

* cited by examiner

COMPRESSED HEAT INSULATION HOUSING

The invention relates to the field of insulation, especially heat or even sound insulation, of pipework (such as piping) conveying or containing a fluid having a temperature different from that of its environment. It is especially sought to limit heat exchange between the pipework and its environment.

More particularly, the invention relates to an assembly comprising a felt, the volume of which is compressed and the density increased compared to its decompressed state.

According to a first embodiment, the assembly is a pipe section which can be used as lagging. According to a second embodiment, the felt is part of a pipe section and is compressed in order to be stored and transported, then decompressed in order to be put in place, as a pipe section, on the pipework to be lagged. According to this second embodiment, the compressibility of the felt makes it possible to store it and to transport it while occupying a very small volume compared to the pipe sections of the prior art, which is very substantially reflected in the storage and transport costs.

A particular application of the invention relates, in the field of domestic fluids, to piping in which hot or cold water flows.

The invention also relates to a method of producing elements, such as annular (in fact tubular) elements, by way of punching, where the starting material is a nonwoven web of bonded (generally by means of a crosslinked binder) fibrous material (viz. felt), such as tempered (in the sense of thermal tempering) mineral wool, where the said method employs a punching (or stamping) tool in the form of at least one punch knife which is mounted in a press plate and is pressed through the nonwoven web of bonded fibrous material then pulled out again.

Means of insulating pipework are sought, whatever the diameter, the length and the radius of curvature thereof.

The thermal insulation of pipes transporting fluids is very widespread, both to protect the pipes from frost and to prevent any excessive losses of positive or negative heat, in particular for energy-saving reasons.

Insulation in buildings and the environment, such as lagging for pipes conveying fluids passing through unheated parts, generally consists of expanded synthetic matter or of mineral wools, in particular glass wool or rock wool. The lagging is then produced by cylindrical elements called pipe sections.

It is known to use annular elements of mineral wool for insulating pipes and pipe bends, with all the fibres of the mineral wool being arranged substantially parallel to one another.

Moreover, it is known to produce such annular (or tubular) elements by punching out from a nonwoven web of bonded fibrous material in the form of tempered mineral wool, where all the fibres are arranged substantially in the longitudinal direction of the said web. The punching is carried out by means of three punching tools which are arranged on the same side of the said web and which are pressed one by one into the said web. While a first punching tool is pressed into the nonwoven web of bonded fibrous material, a knocking punch is simultaneously lowered, the said knocking punch pressing out the first element, such as a cylinder of mineral wool, with the result that a hole is formed in the said web. Then the web is advanced in such a manner that the above hole opposes a second knocking punch placed inside a second punching tool. This second knocking punch is moved into the above hole so as to centre the web, whereafter an annular element is punched out around the said hole. As a result, a hole larger than the said first-mentioned hole is left in the web. Now the web is again advanced a certain distance, whereby the enlarged hole is positioned opposite a third knocking punch. The third knocking punch surrounds a third punching tool, and it is lowered into the enlarged hole whereafter the punching tool in question is pressed into the web. As a result, yet another annular element is punched out, the said annular element presenting a diameter larger than the diameter of the previously produced annular element. In other words, this known method results in the production of two types of annular (or tubular) elements presenting a differing diameter. Such a method is not completely satisfying both because it requires the use of rather bulky equipment and because the compression strength of the produced annular (or tubular) elements is poorer than the compression strength of the starting material.

According to the prior art, the mineral wool lagging systems are in the form of axially split rigid cylindrical lengths. These lengths are rendered rigid because of their very high density and because of the use of considerable amounts of a binder between the fibres. These pipe sections cannot be compressed since if enough force is applied to deform them, their structure is damaged, and the deformed part does not return exactly to its initial shape. The pipe section therefore does not really have a "spring" effect. In particular, these pipe sections are not sufficiently flexible to follow the contours of the bends and curves imposed by the pipework. The fitter using such lagging then has to cut a certain number of mitres in the form of suitably sized sections, which can be matched to the length of pipework needed, then the fitter puts them in place by hand around each curve or elbow. This method takes time, is impractical and inefficient from a thermal point of view.

French patent FR 2378230 discloses pipe sections for lagging pipes, consisting of straight cylindrical elements made of mineral fibres in which the fibres are placed in a plane perpendicular to the axis of the cylinder. This arrangement makes it possible to obtain relatively flexible elements, which can in particular be used on the curved parts of the pipework. However, the flexibility is limited since in this case only the axial compressibility of the pipe sections, in turn provided by the elasticity of the fibres, is used.

Mention may also be made of the following documents as documents of the prior art: WO 96/37728, EP 0205714, FR 2278485, EP 0133083, WO 98/12466.

The invention relates to an assembly comprising, on the one hand, at least one compressed felt element made of mineral wool and, on the other hand, at least one means for maintaining the compression state of the said felt. The compressed felt may return to its initial volume when it is no longer maintained in the compressed state. It is in this sense that the compressed felt is decompressible.

BRIEF DESCRIPTION OF THE DRAWINGS

FIG. 2 illustrates this first embodiment. FIG. 2b) shows the combination of several elements during production.

FIG. 6 shows another embodiment of the compressed assembly according to the invention. Three stamped felt elements are placed in the decompressed state in a transparent plastic cylinder 16, the said cylinder being provided with a male screw thread. It is sufficient to compress the said elements with the plug 18, itself provided with a female screw thread 19 matched to the screw thread 18 so as to make the felt completely re-enter the cylinder, then to screw the plug onto the cylinder, in order to obtain the assembly according to the invention containing the compressed felt.

The method of manufacturing the assembly according to the invention involves the following steps:
- stamping out a mineral wool felt element from a felt mattress, the length of the said element corresponding to the thickness of the mattress, then
- compressing the stamped element in the same direction as the stamping direction in order to decrease its volume, then,
- blocking the stamped element in the compressed state by a means capable of maintaining it in the compressed state, in its reduced volume.

The invention involves at least one felt element for lagging pipework, the term element being equivalent to the term length. The felt may be made of mineral wool such as glass wool or rock wool. The uncompressed initial felt used within the context of the present invention is called a starting felt. It is possible for example to use a starting felt with an isotropic structure in a plane as described in EP 0133083. The starting felt which can be used within the scope of the present invention must be easily compressible, that is to say which can be compressed by hand by an average person without great force. After compression by a pressure which is not likely to damage its fibres too much (the pressure exerted by hand by a person of average strength is suitable), the felt must substantially return to its initial dimension when the said pressure is removed, in a sort of "spring" effect. This spring effect is in fact conferred on the felt by the crosslinked binder with which these types of felt are normally treated. In the absence of a binder, the felt would behave like cotton without any real spring effect. Where too much binder is used, the felt would become too rigid and would not have any spring effect either, too much force then having to be applied to alter the geometry of the felt, which would certainly however damage it by breaking the fibres. The amount of binder must therefore be such that a 10 cm length of starting felt can easily be compressed by one hand alone of a person of average strength, the said felt having to return to its initial volume virtually immediately when it is released by the said person, this having to be at least checked when the compression is exerted in the direction corresponding to the direction of the piping to be covered, that is to say the axial direction of the pipe section, that is to say the longitudinal direction. The felt generally contains a crosslinked binder at the rate of 3 to 8% by weight. The binder is generally a phenol resin.

The direction of stamping corresponds to the direction of the pipework which the pipe section will be intended to surround, the outside of the stamping tool generally having a substantially cylindrical shape. Thus, the stamped felt element generally has the shape of a tube, the length of which, in the decompressed state, corresponds to the thickness of the (starting) felt mattress. As well as outer surfaces, the tube comprises two annular-shaped bases, the said two bases being parallel, and a cylindrical surface placed between the two bases.

Within the context of the present application, the term "longitudinal direction" refers to the stamping direction which also corresponds to the direction of the piping to be covered and, in the case of a felt element having an annular shape, to its axis of revolution. The term "radial direction" refers to the directions perpendicular to the longitudinal direction.

Preferably, the longitudinal direction is perpendicular to the plane in which the mineral wool fibres are deposited during manufacture of the felt. Thus, the fibres are preferably oriented in the radial direction. Crêping the felt is not excluded, but it is not preferred. The thickness of the starting felt may be 20 to 300 mm and preferably 100 to 250 mm. The starting felt may for example have a density ranging from 5 to 25 kg/m$^3$ and preferably 10 to 15 kg/m$^3$ (uncompressed state). Through compression between the hands of a person of average strength, this starting felt can generally be compressed in the longitudinal direction until reaching a density equal to 7 to 10 times, and more generally 8 times that of the starting felt without its structure being damaged, such that the felt returns to its initial volume when it is released.

A rock wool can be used as mineral wool, but preferably a glass wool is used. In fact, because of its manufacturing method, called "internal centrifuging", the glass wool has a lower unfibrized rate and longer fibres and consequently better mechanical properties, when compared to rock wool, which is manufactured by a method called "external centrifuging".

The stamping tool may also make the longitudinal cut allowing the felt element to be opened so as to be able to fit it around the pipework to be lagged. Thus, the direction of the longitudinal cut corresponds to the stamping direction. The longitudinal cut may therefore be made at the same time as the cutting of the tubular shape of the felt element or thereafter.

After stamping, the stamped felt element is compressed so as to reduce its apparent volume. The compression is carried out by virtue of a pressure exerted on the two plane parallel annular-shaped bases. The pressure must be enough to reduce the apparent volume of the element without however destroying the fibres to the extent that if the pressure is removed, the element does not return to its initial volume. To provide an idea of the order of magnitude of the pressure needed, it can be said that, generally, the pressure exerted by both hands of a person of average strength is suitable.

The felt elements are generally of tubular shape and their shape can be defined by a length and two diameters, one (D) corresponding to the outer circular cross section of the element, the other (d) corresponding to the inner circular cross section of the element, it being possible for the latter diameter to correspond to that of the pipework to be lagged (see (D) and (d) in FIG. 1) or close to it.

(D) may range from 35 to 110 mm and more generally it is about 70 mm. (d) may range from 19 to 60 mm and more generally it is about 25 mm.

Figure 1A:
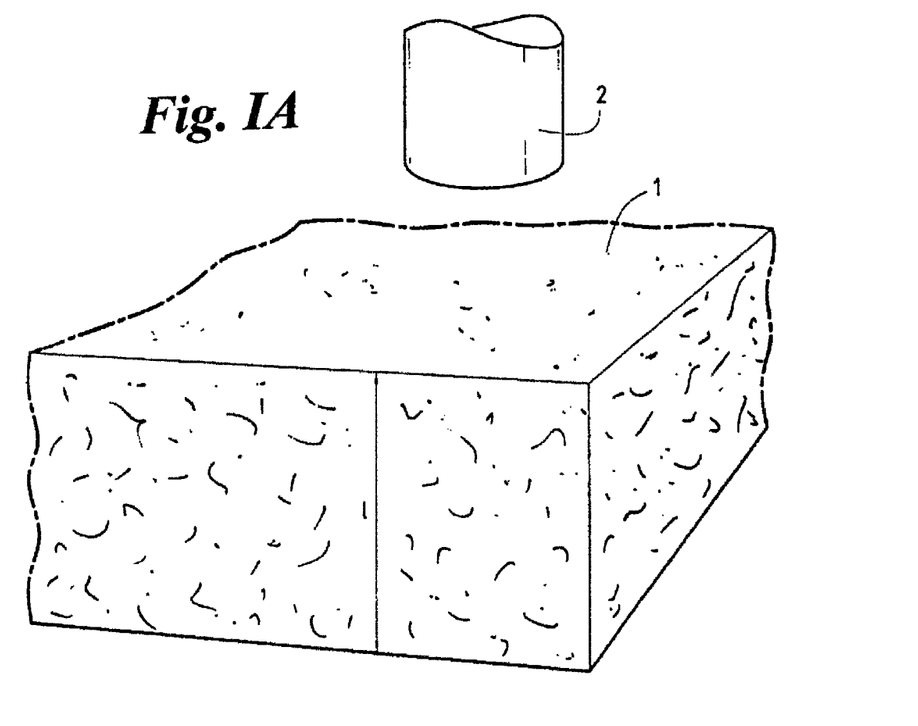
FIG. 1a shows the original felt (1), with a thickness (1) along which the felt element will be stamped and the stamping tool (2) in position above the felt, ready to stamp it.
Figure 1B:
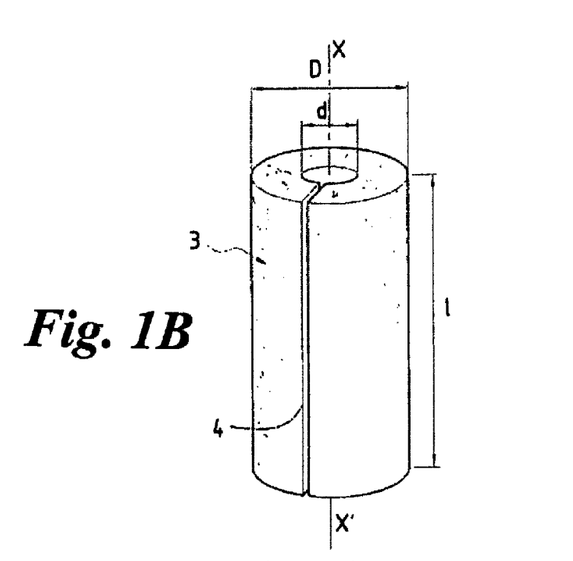
FIG. 1b shows the stamped felt element (3), of tubular shape, the height of the tube being identical to that of the original felt mattress, that is to say equal to (1).

FIG. 1*a* shows the original felt (1), with a thickness (1) along which the felt element will be stamped and the stamping tool (2) in position above the felt, ready to stamp it. FIG. 1*b* shows the stamped felt element (3), of tubular shape, the height of the tube being identical to that of the original felt mattress, that is to say equal to (1). A longitudinal cut (4), serving to open the element so that it can be placed around pipework, has been made after cutting the tubular shape of the felt element.

According to a first embodiment, the stamped starting felt element is compressed in the longitudinal direction, and is maintained in the compressed state by a film which is wound around it over its cylinder-shaped surface. For the felt element to be properly maintained in the compressed position, it is preferable to adhesively bond the film around the element. In this case, the maintaining means is therefore the film, preferably combined with the adhesive. Since the felt element is also compressible to some extent in the radial direction, it is possible, on applying the film, also to compress the said element in the radial direction in order to slightly decrease its diameter. Because of the spring effect which the felt element also exerts in the radial direction, the film applied to the pipe section has a more stretched, less creased appearance, which is aesthetically advantageous. The compression exerted on the felt during construction of the surfaced pipe section should only be partial, this being the longitudinal compression on the one hand, but of course also the slight radial compression. The felt compressed inside the surfaced pipe section may for example have a density ranging from 15 to 30 kg/m$^3$ and preferably 18 to 24 kg/m$^3$. Preferably, the ratio of the compressed felt density inside the surfaced pipe section to the starting felt density (before compression) ranges from 1.5 to 2.5.

Within the context of this first embodiment, the compressed felt element is in fact only compressed partially compared to that which the initial felt could theoretically withstand. It is in this sense that the compressed felt remains compressible. The pressure exerted for the compression must be such that the felt maintained in the compressed state remains deformable so that when it is placed in the compressed state around pipework, it can easily follow the changes in direction of the said pipework and especially the 90° bends. The compressed felt element is therefore, for this first embodiment, easily deformable in order to form a 90° bend.

The film comprises at least one layer of a thermoplastic polymer such as a polyolefin (polyethylene, polypropylene or the like) or a polyester such as polyethylene terephthalate (PET). The film may also comprise an aluminium layer, and in this case, this is generally to provide the pipe section with a metallized appearance. The optional aluminium layer is therefore generally visible from the outside, either because it is on the outer face of the pipe section, or because it is visible through the thermoplastic polymer layer. The aluminium layer may be from an aluminium sheet which has been laminated onto the thermoplastic polymer layer, or it may come from vapour deposition (by metallization or sputtering) produced on the thermoplastic polymer layer, on its inner or outer face (with respect to the pipe section).

The film may also be strengthened by glass or polymer (for example PET) fibre, generally continuous fibre adhesively bonded to the film in parallel lines (strands of fibre form parallel lines) or forming a grid. This fibre can be applied to the film at a rate of 10 to 100 g/m$^2$.

Generally, the film has a thickness ranging from 10 to 100 μm and preferably from 10 to 80 μm.

Some examples of films suitable for producing surfaced pipe sections are given below:

| Layer type | Thickness (μm) | Grammage (g/m$^2$) |
|---|---|---|
| Polyethylene metallized by aluminium on its inner face | 12 | 17 |
| metallized polyester | 13 | 20 |
| glass/polyester grid | — | |
| polypropylene | 38.1 | 75 |
| Polyethylene metallized by aluminium on its inner face | 50 | 70 |
| Polyethylene metallized by aluminium on its inner face | 75 | 105 |
| Polyethylene metallized by aluminium on its inner face | 12 | 17 |
| aluminium sheet | 20 | 90 |
| glass fibre grid | — | |
| low-density polyethylene bonding | 20 | |

In this table, each line provides an example. In the first column of this table, when the film comprises several layers, the outer layer (visible from outside the pipe section) has been indicated first of all, the other layers then being indicated in the order of their presence starting from the outer layer.

Figure 2A:
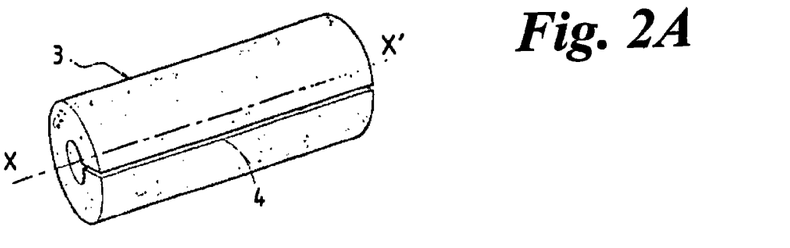
FIG. 2a shows a stamped starting felt element, free of any stress and therefore not compressed.
Figure 2B:
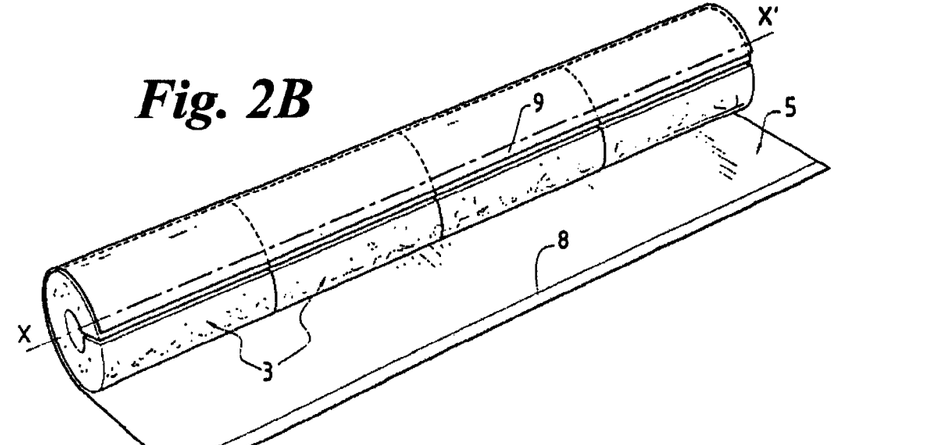
FIG. 2b shows several (four) of these elements juxtaposed and compressed (the length of each of these elements is reduced compared to that in FIG. 2a) which are maintained in the compressed state while the pre-sized film is applied around the said elements.

FIG. 2 illustrates this first embodiment. FIG. 2*a* shows a stamped starting felt element, free of any stress and therefore not compressed. FIG. 2*b* shows several (four) of these elements juxtaposed and compressed (the length of each of these elements is reduced compared to that in FIG. 2*a*) which are maintained in the compressed state while the pre-sized film is applied around the said elements. FIG. 2*b*) shows the combination of several elements during production. At the end of the said production, the film completely surrounds the juxtaposed elements in order to form what is known as a surfaced pipe section (with reference to the surface state conferred on the pipe section by the film) combining several juxtaposed stamped felt elements. The term "surfaced pipe section" denotes the assembly comprising at least one compressed felt element (generally several compressed felt elements) in the longitudinal direction, the said at least one element being surrounded over its outer surface parallel to its axis (X-X' in FIG. 2) with a film maintaining its compressed state. The possible various elements have their respective axes of revolution (X-X' in FIG. 2) which are mutually coincident. Of course, where adhesive is needed to maintain the compression state, the desired compression state must be maintained while the adhesive hardens and makes the film able to maintain the said compression state alone. Surrounding only a single element in the compressed state with the film is not excluded. However, in general, at least two elements, and more generally at least three elements, and even more generally four or five or six or seven elements are placed inside the surfaced pipe section. These various elements touch each other inside the pipe section by their ring-shaped bases (base having the ring shape of the tube forming the pipe section). Of course, if the said pipe section contains several elements, the longitudinal cuts 4 of the various juxtaposed elements are aligned inside the surfaced pipe section. Inside one and the same pipe section containing several elements, the elements are tightly packed against each other under the effect of their own compression. So, in this way, it is possible to make the surfaced pipe section follow pipework having paths which are very diverse and not always straight, such as bends, without the elements inside the pipe section separating. The fact that the felt element or elements are compressed inside the pipe section while still remaining compressible provides the pipe section with the ability to be easily placed on the pipework even when not straight and possibly comprising bends. This is because, in a bend, the felt element at the location of the bend will follow the bend, while being compressed more on the inside of the bend, and two felt elements will also remain properly juxtaposed in such a bend, as has already been explained. In this way, although it is not excluded to adhesively bond various felt elements to each other by their base inside a pipe section, this does not appear to be necessary if the said elements are sufficiently tightly packed against each other under the effect of their compression within the pipe section.

As a result, the insulation of the portions of the pipework which are not straight can be correctly ensured.

The surfaced pipe section may have, for example, a length ranging from 30 to 120 cm.

In general, the pipework to be insulated is longer than a single surfaced pipe section, and it is generally appropriate to juxtapose several surfaced pipe sections one after another. The user responsible for insulating pipework may find it useful to vary the compressibility of the surfaced pipe sections in order to pack them tightly against each other by compressing them slightly in the direction of their axis (that is to say that of the pipework). Thus, the plant benefits from the spring effect of the pipe sections in order to provide a proper junction between the pipe sections.

Figure 3:
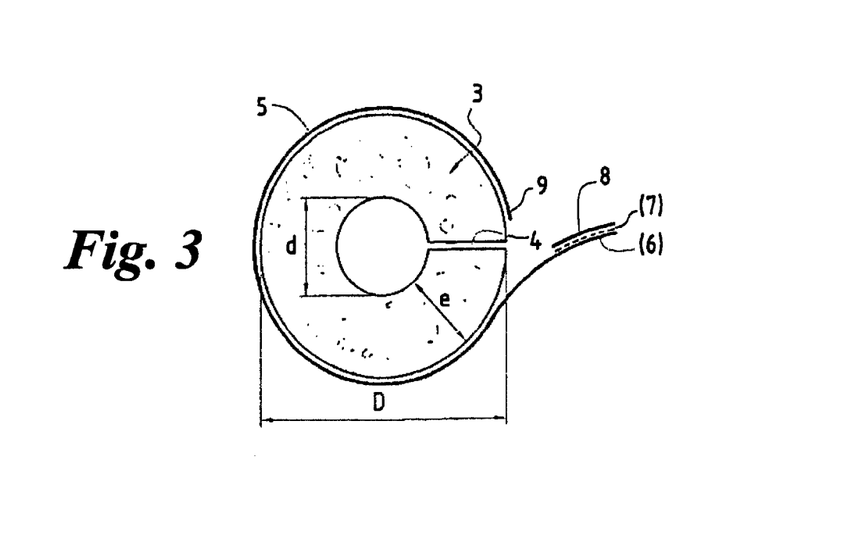
FIG. 3 shows pipe section (3) seen in the direction of its axis.

The surfaced pipe section may be of the type shown in FIG. 3, which shows the pipe section (3) seen in the direction of its axis. This pipe section has been surrounded with a flexible plastic film (5). The film has been adhesively bonded to the outer cylinder-shaped face of the pipe section. The film, in its dimension intended to go around the pipe section, is a little longer than the outer perimeter of the pipe section so as to make a flap (6). The function of this flap is to close up the pipe section above the longitudinal cut (4) after having been placed around the pipework to be lagged. The flap may be provided with a layer of adhesive (7) (for example a permanent adhesive of the hot-melt type) shown in dotted lines. The adhesive layer itself may be covered with a strip (8) of a peelable film (for example made of siliconized paper) whose function is to protect the adhesive until the final use. After having placed the pipe section around the pipework to be lagged, the fitter peels off the peelable strip (8) and sticks the flap to the other edge of the metallized film (5), that is to say to the region (9) as shown in FIG. 3. The pipe section is then properly held in place on the pipework, the flap covering the longitudinal cut. It is also possible not to resort to the peelable strip, since the flap 6 can be directly stuck and unstuck as desired to the region 9 by varying the properties of the permanent adhesive having the property allowing repositioning. In this case, before placement around the pipework, the user has the pipe section in the closed state, the flap 6 being stuck to the region 9 (absence of peelable film 8). He then unsticks the flap in order to discover the longitudinal cut 4, places the pipe section around the pipework, and closes the pipe section again by resticking the flap 6 to the region 9. By virtue of the repositioning property conferred by the adhesive, it is then still possible for the pipe section to be easily taken off and put back around the pipework by unsticking then sticking the flap, for example so as to be able to carry out repairs on the pipework.

The surfaced pipe section also has the ability to be compressible in the direction perpendicular to its axis. The user may vary this property and close the pipe section by choosing a flap position which tightly closes the pipework to a greater or lesser degree. This is because, by virtue of this compressibility property, it is possible to place the pipe section on pipework whose diameter is not exactly that of the internal diameter of the pipe section before placement on the pipework. The diameter of the pipework may thus be slightly less than or slightly greater than that of the internal diameter of the pipe section before placement on the pipework.

In particular, the surfaced pipe section has the advantage of making it easier to repair the pipework that it covers. This is because, when the pipework would have to be repaired, it is not essential to detach the pipe section from the pipework. In fact it is enough to overcompress the pipe section in the longitudinal direction at the location where the repair is needed so as to uncover the pipework and the defect to be repaired, to maintain this overcompression state, and to carry out the repair. Once the latter is finished, it is enough to remove the overcompression so that the pipe section again covers the pipework. In this case, the fact that the surfaced pipe section remains compressible is therefore of benefit.

The surfaced pipe section may, for example, have an internal diameter ("d" in FIG. 3) ranging from 6 to 34 mm and a thickness ("e" in FIG. 3) ranging from 19 to 25 mm.

The surfaced pipe section may, for example, have the following dimensions:

| External diameter | 72 mm | 66 mm | 80 mm | 110 mm |
|---|---|---|---|---|
| Internal diameter | 22 mm | 28 mm | 42 mm | 60 mm |
| Length | 1200 mm | 1000 mm | 600 mm | 1800 mm |
| Diameter of pipework to be covered | 17 to 27 mm | 33 to 42 mm | 40 to 49 mm | 50 to 60 mm |

According to a second embodiment of the invention, the maintaining means is not permanently fastened to the felt element and may be removed so that the felt element returns to its volume before compression. The benefit here is that the stamped felt element is compressible but also decompressible in the longitudinal direction. In this case, after compression in the longitudinal direction, the compressed felt element is maintained in its compressed state by virtue of a maintaining means. Thus it is possible to store and transport the element with a reduced volume. Before using the element to be placed around the pipework to be insulated, the maintaining means is removed, which allows the element to return to its volume before compression. Of course, in general, there will be several (two or three or four or five or six or seven, or even more) felt elements juxtaposed by their ring-shaped base which will be compressed together and held together juxtaposed by the same maintaining means.

Thus, the invention relates to an assembly comprising, on the one hand, at least one compressed felt element made of mineral wool and, on the other hand, a means of maintaining the compression state of the said element, it being possible for the latter to return to a less compressed state when it is released from the said maintaining means.

After compression to the chosen volume, the felt element is blocked in its position by at least one means of maintaining its compressed state. This maintaining means may be any suitable system. For example, it is possible to proceed as follows: place a rigid sheet, for example made of board or of a plastic such as a polyolefin (PE, PP, etc.), on each of the two faces to be brought together of the stamped element then exert a pressure on the outer faces of the two rigid sheets, then, the assembly being maintained in the compression position, the assembly is surrounded by a heat-shrinkable film and the said sleeve is heated so that it shrinks and tightly holds the assembly in order to maintain it in the compressed state. It is then possible to remove the initial pressure being exerted on the faces of the rigid sheets in order to recover an assembly comprising a felt element blocked in the compressed state by a maintaining means. In this case, the maintaining means consists of two rigid sheets placed on either side of the compressed felt element and of the heat-shrunk sleeve closely fitting the felt element and at least the perimeter of the two rigid sheets so as to provide cohesion to the said assembly. This assembly may be easily handled, stored or transported while having a low volume. At the time of its use, it is sufficient to cut or tear the heat-shrinkable sleeve so that the felt element returns to its starting volume, that is to say before compression. The felt element may then be put in place as a pipe section on the pipework to be lagged.

It is also possible to proceed in this way: at least one felt element in the uncompressed state is placed in a cylinder closed at one of its ends and fitted with a screw thread at the other end. The felt element is then compressed so that it completely re-enters the cylinder and the cylinder is then closed by a plug which is screwed onto the screw thread of the cylinder. In this case, at the time of using the felt element, it is sufficient to unscrew the plug from the cylinder so that the felt element is decompressed and returns to its volume before compression in order to be held by the maintaining means. The felt element may then be put in place on the pipework to be lagged, as a pipe section.

Within the context of this second embodiment, in general, a felt element is not compressed alone, but is combined with other identical felt elements which are compressed in the same way. In their compressed state, all these felt elements are juxtaposed by their ring-shaped bases, their outer cylinder-shaped surfaces all being in line with each other.

Within the context of this second embodiment, the felt element released from its maintaining means may be an insulation pipe section. At least one felt element may be provided on its outer cylinder-shaped surface with a flexible sheet or a flexible film which does not prevent the said element from being compressed and decompressed. It may involve an aluminium sheet, generally adhesively bonded to the said outer cylinder-shaped face. However, if it is desired to provide the said element with such a coating on its outer cylinder-shaped face, it is preferred that the said coating comprises at least one layer of a thermoplastic polymer, for example based on a polyolefin (polyethylene, polypropylene or the like). This is because a thermoplastic polymer of this sort is more flexible than an aluminium sheet, and the compression and decompression in this case results in a less creased external appearance which is therefore more aesthetic. It is also possible to use one of the films mentioned within the context of the first embodiment. In general, when using several felt elements and one film, these felt elements, aligned along their axis and touching each other by their ring-shaped base, are brought together and surrounded by a common film (one length of film surrounds several felt elements).

In the context of this second embodiment, it is possible to compress the felt such that its density approaches the maximum possible value already given, that is 7 to 10 times, and more generally about 8 times, the density of the starting felt, without damaging the felt structure. More generally, the compression is carried out in the context of this second embodiment so that the felt reaches a density ranging from 15 to 150 kg/m$^3$.

In the context of this second embodiment, it is possible to use a surfaced pipe section, as already described in the context of the first embodiment, as a felt element. In this case, the felt element is already partly compressed within the context of the first embodiment, and is even further compressed within the context of the second embodiment. When the maintaining means is removed, the surfaced pipe section returns to its initial volume, which means that the felt remains compressed as it was for the execution of the first embodiment.

Figure 4:
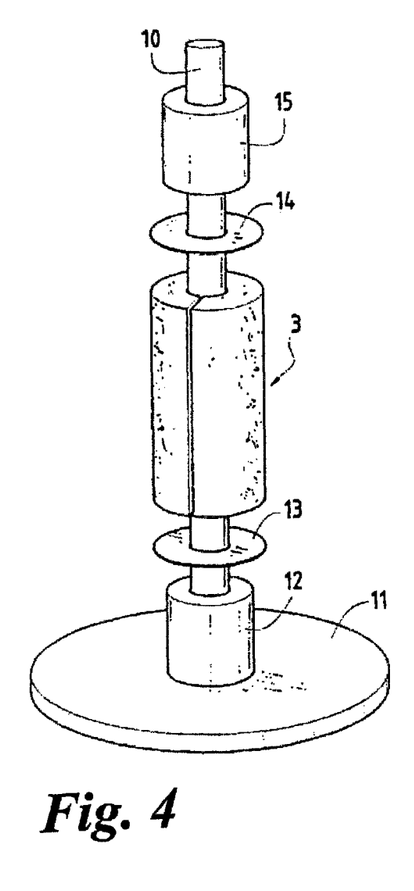
FIG. 4 shows the parts which can be used to produce an assembly according to the invention (second embodiment) comprising two felt elements maintained in compression by means of two rigid sheets (made of board or plastic or any other suitable material) and a heat-shrinkable film.

FIG. 4 shows the parts which can be used to produce an assembly according to the invention (second embodiment) comprising two felt elements maintained in compression by means of two rigid sheets (made of board or plastic or any other suitable material) and a heat-shrinkable film. The following are slipped over a bar 10 secured to a base 11 acting as a stop:

a first rigid mandrel 12 (for example made of metal), then
a first rigid sheet 13 (for example made of board) with a diameter close to those of the elements to be compressed, then
the two elements 3 to be compressed possibly provided with their flexible film coating (not shown), then
a second rigid sheet 14 (for example made of board) with a diameter close to those of the elements to be compressed, then
a second rigid mandrel 15 (for example made of metal).

The mandrels 12 and 15, of tubular shape, have a diameter less than that of the rigid sheets 13 and 14.

Figure 5:
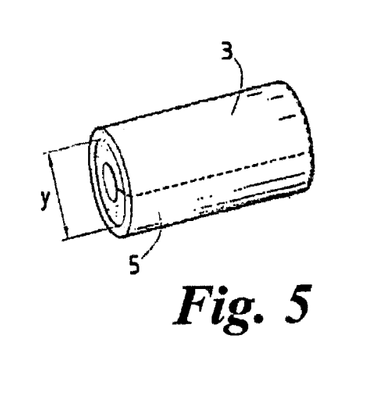
FIG. 5 depicts an assembly comprising the felt maintained in the compressed state by the rigid board sheets placed on either side of the felt, and the heat-shrunk film.

Next, a pressure is exerted on the mandrel 15 so as to tightly pack all the parts slipped over the bar 10 and therefore so as to compress the felt elements. The pressure needed to obtain the desired compression rate is exerted. Next, a heat-shrinkable thermoplastic film sleeve is placed around the compressed assembly, the diameter of the said sleeve of course being greater than the diameter of the felt elements and of the rigid sheets to be packed together while remaining adjacent, and the sleeve is heated so that it shrinks and maintains the tightly packed state of the said elements and the rigid sheets. An assembly as shown in FIG. 5 is then obtained, comprising the felt maintained in the compressed state by the rigid board sheets placed on either side of the felt, and the heat-shrunk film. The dimension of the heat-shrinkable film is chosen so that, after shrinking, the heat-shrunk film leaves enough space on the sides so as to be able to free the mandrels 12 and 15. This means that the heat-shrunk film forms orifices on the side faces of the final assembly, the diameter (y) of the said orifices being greater than that of the mandrels 12 and 15, which makes it possible to free, without difficulty, the assembly containing the felt from the mandrels.

Figure 6:
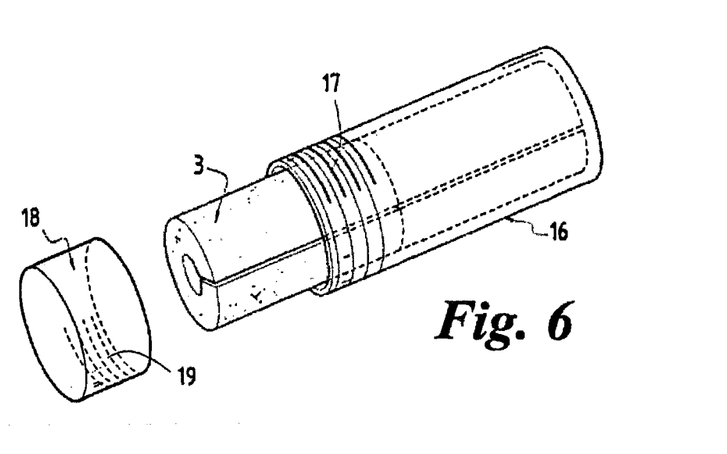

FIG. 6 shows another embodiment of the compressed assembly according to the invention. Three stamped felt elements are placed in the decompressed state in a transparent plastic cylinder 16, the said cylinder being provided with a male screw thread. It is sufficient to compress the said elements with the plug 18, itself provided with a female screw thread 19 matched to the screw thread 18 so as to make the felt completely re-enter the cylinder, then to screw the plug onto the cylinder, in order to obtain the assembly according to the invention containing the compressed felt.

The invention also relates to a punching (or stamping) method which, compared to the known methods of punching, is far simpler and more reliable, and which can be carried out by means of equipment requiring only little room, and which in addition ensures that the compression strength of the elements punched out is substantially identical to the compression strength of the starting material.

The punching method according to the invention is characterized in that the tubular punch knife used projects through the press plate and is of a length which is 80 to 350%, preferably 200 to 300%, of the thickness of the web, and in that the punching is carried out against a back-pressure plate optionally provided with holes, and in that the punching is carried out such that initially an element just punched out is temporarily retained in the punch knife, but after a stepwise advancing of the web of fibrous material, such as mineral wool, and a renewed pressing inwards of the tubular punch knife, the said element is pressed backwards through the said punch knife by means of the element now punched out. In this manner it is in a very simple and reliable manner obtained that once each element has been punched out and placed in the punching tool, the said element is pressed out of the punching tool by the punching element being punched out by the punching tool in the next working layer. The tubular punch knife and the associated press plate do not take up much room. The compression strength of the annular elements has not been noticeably reduced compared to the compression strength of the starting material.

According to one embodiment of the punching method according to the invention, the elements are for instance used for heat-insulating casings for pipes, and this embodiment of the method is characterized in that the punch knives used are formed by a tubular punch knife of large diameter and a tubular punch knife of small diameter, the said tubular punch knives being arranged on their respective sides of the web of mineral wool, and in that individually the punch knives are pressed into the web and into one another with the result that an annular element formed between the said punch knives settles as a plug in the large-diameter tubular punch knife, and that once the two punch knives have been pulled apart the web of mineral wool is advanced one step, and the two tubular punch knives are again individually pressed into the said web of mineral wool with the result that the annular element now punched out presses the annular element punched out during the previous step out of the large-diameter tubular punch knife, the said latter annular element being rearwardly released from the latter punch knife. This embodiment turned out to be particularly suited to the production of annular elements.

A second embodiment of the punching method according to the invention is characterized in that the plug of mineral wool fibres resulting from the pressing inwards into the web at the small tubular punch knife is sucked rearwardly out through the punch knife by means of a suction device.

A third embodiment of the punching method according to the invention is characterized in that the punch knives rotate while being pressed into the web with the result that the elements punched out are provided with a particularly even surface.

A fourth embodiment of the punching method according to the invention is characterized in that the annular elements expelled from the large tubular punch knife are collected immediately after their release, which turned out to be the most advantageous procedure when the method is to be carried out relatively quickly.

A fifth embodiment of the punching method according to the invention is characterized in that the starting material used is woven fibres of glass wool, rock wool or plant fibres with a density of 15 to 80 kg/m$^3$, preferably 35 kg/m$^3$, and in that the web has a thickness of 4 to 20 cm, preferably 5 to 15 cm, especially approximately 10 cm. This embodiment turned out to be particularly advantageous.

The invention relates also to an apparatus for carrying out the punching method according to the invention, the said apparatus comprising a device for stepwise advancing of a web of fibrous material, such as a web of mineral wool or plant fibres, where the said fibres extend in the longitudinal direction of the web, as well as a press plate provided with at least one punch knife. This apparatus is characterized in that the punch knife is tubular and of a length which is 80 to 500%, preferably 100 to 350%, especially 200 to 300% of the thickness of the web of material, and in that a back-pressure plate optionally provided with a hole is arranged opposite and at a distance from the press plate, and in that the punch knife is mounted in a hole in the said press plate so as to ensure that the pressing outwards of the element punched out can take place rearwardly through the inner channel of the punch knife. This apparatus turned out to be particularly suited to carrying out the method.

According to the invention, the punch knives may comprise a tubular punch knife of large diameter and a tubular punch knife of small diameter, the said punch knives being arranged directly opposite one another on their respective sides of the web of bonded fibrous material in such a manner that the small-diameter punch knife can be pressed against a second back-pressure plate which is removed after the punch knife has passed through the web, and the large-diameter punch knife may slide over the small diameter punch knife, preferably substantially coaxially to the said punch knife. Such an apparatus turned out to operate in a particularly efficient manner, and in addition it only takes up little room.

According to the invention, the small-diameter tubular punch knife may be associated with a suction device with the result that it is particularly easy to remove the plug of mineral wool formed inside the small tubular punch knife.

Finally, the small-diameter tubular punch knife may, according to the invention, be of a length which is 80 to 150%, preferably 100 to 120% of the thickness of the web. Such an embodiment of the small punch knife turned out to be particularly suited for use by the method according to the invention.

Figure 7:
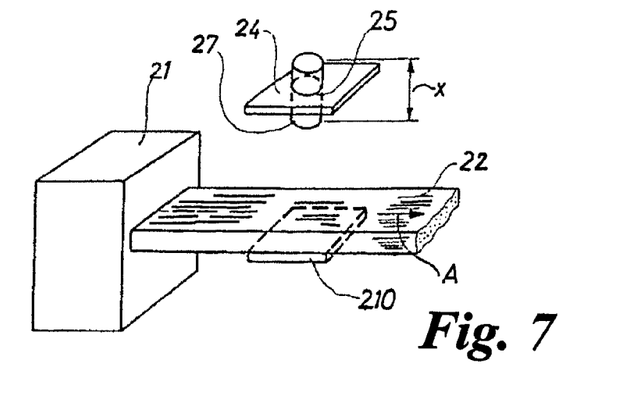
FIG. 7 is a perspective and diagrammatic view of a first embodiment of an apparatus according to the invention, a punch knife being shown in its uppermost position.
Figure 8:
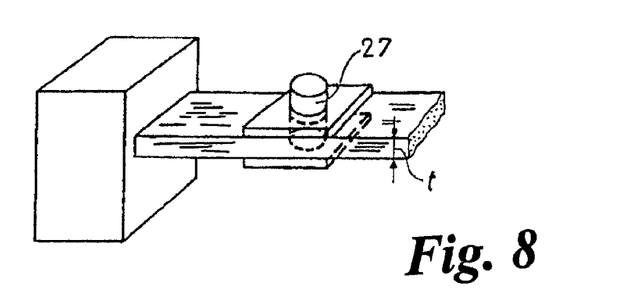
FIG. 8 corresponds to FIG. 7 but where the punch knife is positioned in its lowermost position.
Figure 9:
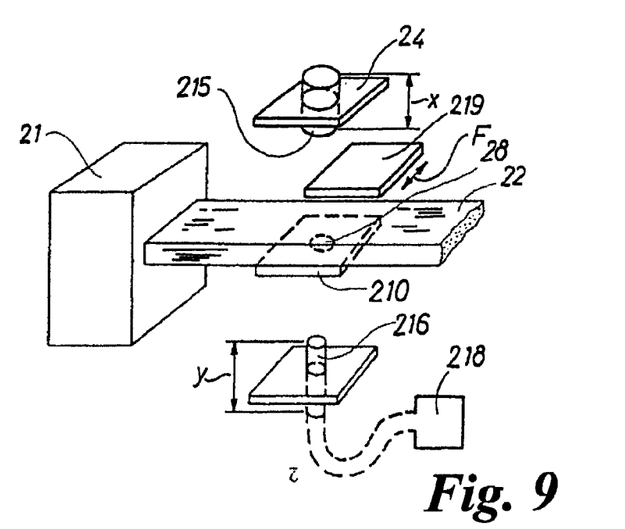
FIG. 9 is a perspective and diagrammatic view of a second embodiment of the apparatus according to the invention, the said apparatus being provided with two punch knives.
Figure 10:
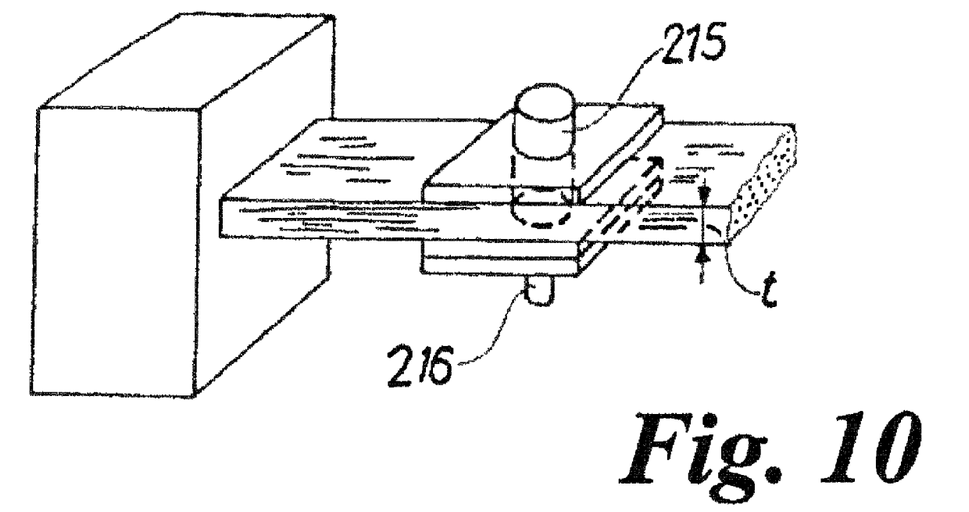
FIG. 10 corresponds to FIG. 9 but the punch knives have been pressed into the web.
Figure 11:
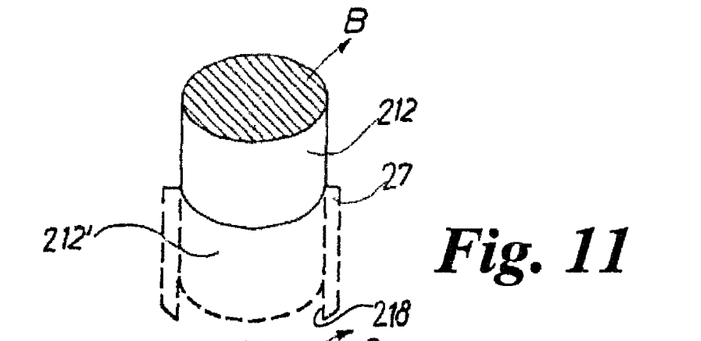
FIG. 11 is a perspective and diagrammatic view on a large scale of an element punched out, the said element being pressed upwards and out through a punch knife by another element just punched out.
Figure 12:
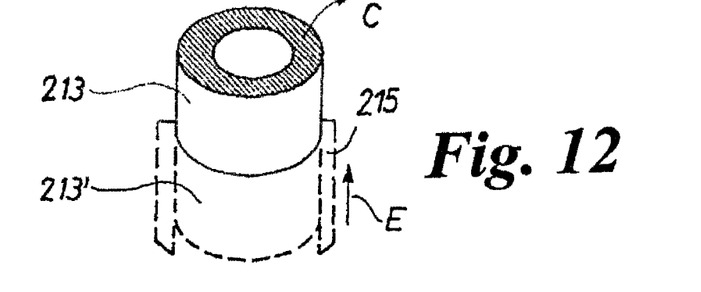
FIG. 12 corresponds to FIG. 11, but whereby the elements punched out comprise a central hole.
Figure 13:
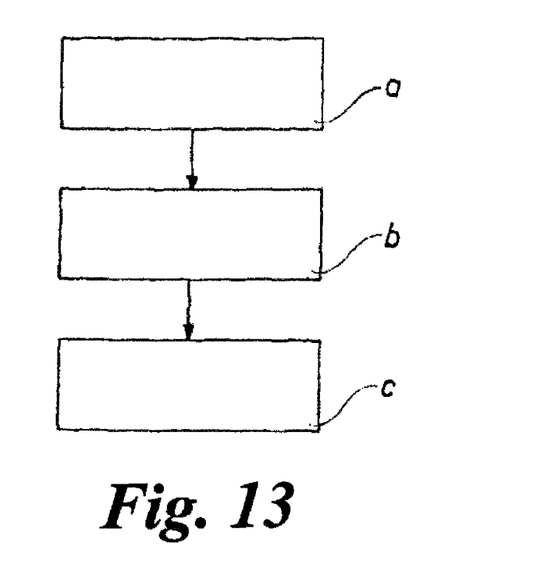
FIG. 13 is a diagrammatic view of the three steps of the punching method.

FIG. 7 is a perspective and diagrammatic view of a first embodiment of an apparatus according to the invention, a punch knife being shown in its uppermost position, FIG. 8 corresponds to FIG. 7 but where the punch knife is positioned in its lowermost position, FIG. 9 is a perspective and diagrammatic view of a second embodiment of the apparatus according to the invention, the said apparatus being provided with two punch knives, FIG. 10 corresponds to FIG. 9 but the punch knives have been pressed into the web, FIG. 11 is a perspective and diagrammatic view on a large scale of an element punched out, the said element being pressed upwards and out through a punch knife by another element just punched out, FIG. 12 corresponds to FIG. 11, but whereby the elements punched out comprise a central hole, FIG. 13 is a diagrammatic view of the three steps of the punching method.

The apparatus shown in FIG. 7 is used for carrying out the punching method according to the invention. The punching method will be described in greater detail below. The apparatus comprises a device 1 for a stepwise advancing of a web 22 of bonded fibrous material, such as a mineral wool or plant fibres, where the fibres extend in the longitudinal direction A of the web. In addition, the apparatus comprises a press plate 24, and a punch knife 27 is mounted in a hole 25 in the said press plate 24. The punch knife 27 is tubular and of a length x which is 80 to 500%, preferably 100 to 350%, especially 200 to 300% of the thickness t of the web 22. A back-pressure plate 210 optionally provided with a hole 28, see FIG. 9, is arranged opposite the press plate 24. The punch knife 27 is of such a length that when the punch knife has been pressed into the web, the element punched out is pressed backwards and out through the inner channel of the punch knife, viz. when the said punch knife is pressed by one or more succeeding strokes into the web so as to punch out further elements.

As illustrated in FIG. 9, the punch knives can also be formed by a tubular punch knife 215 of large diameter and a tubular punch knife 216 of small diameter. These punch knives are arranged directly opposite one another next to the web 22. Thus the punch knives 215 and 216 are arranged such that the punch knife 216 can slide into the punch knife 215 while it is being pressed into the web 22, see FIG. 10, the said punch knife 216 preferably sliding substantially coaxially to the said punch knife 215.

As illustrated in FIG. 9, the punch knife 216 can be associated with a suction device 218 which can collect material from the plug formed in the interior of the punch knife 216 during the inward pressing of the said punch knife 216 into the web 22. The punch knife 216 can be of a length y which is 80 to 150%, preferably 100 to 120% of the thickness t of the web 22. In FIG. 9 the punch knife 216 is shown particularly long for the sake of clarity.

The punching method according to the invention is used for producing elements, such as annular elements, by way of punching, and it employs a starting material in the form of a web of bonded fibrous material, such as tempered mineral wool, rock or glass wool. The object of the punching method according to the invention is to provide the ready-made elements with the same compression strength and flexibility as the starting material. The punching method involves the following steps, see FIG. 13:

a) the tubular punch knife 27 projects through the press plate 24 and is of a length which is 80 to 350%, preferably 200 to 300% of the thickness of the web, b) the punching by means of the punch knife 7 is carried out against a back-pressure plate 210 optionally provided with holes 28 and c) the punching is carried out in such a manner that an element 212 just punched out, see FIG. 11, is initially retained in the punch knife 27, but after a stepwise advancing of the web 2 of mineral wool and a renewed pressing inwards of the tubular punch knife 27, the said element is pressed rearwards and outwards through the said punch knife by means of the element 212' now punched out.

FIGS. 11 and 12 show how the initially punched out elements 212 and 213, respectively, are about to be pressed out through the tubular punch knife 27 and the tubular punch knife 215, respectively, and away from the said punch knife, see the arrow B and the arrow C, respectively, once the punch knife 27 and the punch knife 215, respectively, have again been pressed downwards into the web 22, the punch knives 27 and 215 only being indicated by means of a dotted line in FIGS. 11 and 12. The latest punching results in formation of the elements 212' and 213', respectively, and these elements press the elements 212 and 213, respectively, resulting from the previous punching, through the tubular punch knives 27 and 215, respectively. When stacked or juxtaposed, the produced annular elements 213, 213' can for instance be used as heat-insulating casings for pipes.

It should be noted, in connection with the embodiment shown in FIG. 9, that the punch knife 216 is initially pressed inwards, viz. towards a second back-pressure plate 219. This back-pressure plate 219 is placed in an advanced position, but immediately after the above pressing the back-pressure plate 219 is returned to a retracted position, see the two-way arrow F, whereafter the punch knife 215 is pressed into the web. When the two punch knives have been pulled away from one another and the web has been advanced one step, the two punch knives 216 and 217 can again be pressed into the said web. The annular element 213' now punched out presses the annular element 213 punched out during the previous step upwards (see the arrow E) and outwards (see the arrow C) of the large-diameter tubular punch, the latter annular element 213 being rearwardly released from the punch knife 27.

According to a particular punching method step, the punch knives 215 and 215 rotate while being pressed into the web 22.

The annular elements 213 expelled from the large tubular punch knife 215 can be collected immediately after their release.

Within the context of the punching method according to the invention, the starting material used can be made of bonded fibres of glass wool, rock wool or plant fibres with a density of 15 to 80 kg/m$^3$, preferably 35 kg/m$^3$. The web can be of a thickness of 4 to 20 cm, preferably 5 to 15 cm, especially approximately 10 cm.

The invention claimed is:

1. A method for producing an element by punching from a starting material that is a web of bonded fibrous material, comprising:

employing a punching tool in a form of at least one punch knife mounted in a press plate and pressed through the web and then pulled out again, wherein the tubular punch knife used projects through the press plate and is of a length which is 80 to 350%, of a thickness of the web of bonded fibrous material, and wherein the punching is carried out against a first back-pressure plate provided with a hole, and wherein the punching is carried out such that initially an element just punched out is temporarily retained in the punch knife, but after a stepwise advancing of the web of fibrous material, and a renewed pressing inwards of the tubular punch knife, the element is pressed backwards through the punch knife by the element now punched out;

wherein the web comprises a mineral wool suitable for use as heat insulation casings for pipes, wherein the punch knives used are formed by a tubular punch knife of large diameter and a tubular punch knife of small diameter, wherein the large and small diameter tubular punch knives are arranged on their respective sides of the web comprising mineral wool, and wherein the punch knives are individually pressed into the web and into one another, the small diameter tubular punch knife being moved into the hole of the first back pressure plate, the small diameter tubular punch knife pressing against a second back-pressure plate, with a result that an annular element formed between the punch knives settles as a plug in the large-diameter tubular punch knife and once the two punch knives have been pulled apart the web comprising mineral wool is advanced one step, and the two tubular punch knives are again individually pressed into the web comprising mineral wool with a result that a first annular element now punched out presses a second annular element punched out during the previous step out of the large-diameter tubular punch knife, the second annular element being rearwardly released from the large-diameter tubular punch knife, wherein the starting material used comprises glass wool, rock wool, and/or plant fibers with a density of 15 to 80 kg/m$^3$, and the web has a thickness ranging from 4 to 20 cm.

2. The method of claim 1, wherein the tubular punch knife is 200% to 300% of the thickness of the web of bonded fibrous material.

3. The method according to claim 1, wherein the web has a thickness ranging from 5 to 15 cm.

4. The method of claim 1 that produces a compressed element having a compression ratio of 1.5 to 2.5 and which provides a material useful for lagging having a spring effect when released from a compressed state.

5. The method of claim 1, wherein said starting material comprises rock wool.

6. The method of claim 1, wherein said starting material comprises glass wool.

7. The method of claim 1, wherein said starting material comprises plant fibers.

8. The method of claim 1 that produces an element that is not split axially.

* * * * *

UNITED STATES PATENT AND TRADEMARK OFFICE
CERTIFICATE OF CORRECTION

| | | |
|---|---|---|
| PATENT NO. | : 8,459,159 B2 | |
| APPLICATION NO. | : 12/548253 | |
| DATED | : June 11, 2013 | |
| INVENTOR(S) | : Erling Jessen et al. | |

It is certified that error appears in the above-identified patent and that said Letters Patent is hereby corrected as shown below:

In the Specification:

Column 6, line 28, "aluminum sheet 20 / 90" should read --aluminum sheet 20 /--;

Column 6, line 29, "glass fibre grid — /" should read --glass fibre grid — / 90--.

Column 13, line 6, "lengthx" should read --length x--.

Signed and Sealed this
Seventeenth Day of September, 2013

Teresa Stanek Rea
*Deputy Director of the United States Patent and Trademark Office*